United States Patent
Chui et al.

(10) Patent No.: US 11,449,967 B2
(45) Date of Patent: Sep. 20, 2022

(54) MACHINE LEARNING BASED IMAGE PROCESSING TECHNIQUES

(71) Applicant: Outward, Inc., San Jose, CA (US)

(72) Inventors: Clarence Chui, Los Altos Hills, CA (US); Manu Parmar, Sunnyvale, CA (US)

(73) Assignee: Outward, Inc., San Jose, CA (US)

( * ) Notice: Subject to any disclaimer, the term of this patent is extended or adjusted under 35 U.S.C. 154(b) by 0 days.

(21) Appl. No.: 17/131,586

(22) Filed: Dec. 22, 2020

(65) Prior Publication Data

US 2021/0110518 A1  Apr. 15, 2021

Related U.S. Application Data

(63) Continuation of application No. 16/056,110, filed on Aug. 6, 2018, now Pat. No. 10,902,559.

(Continued)

(51) Int. Cl.

| | |
|---|---|
| *G06T 5/00* | (2006.01) |
| *G06K 9/62* | (2022.01) |
| *G06T 7/60* | (2017.01) |
| *G06T 7/40* | (2017.01) |
| *G06N 20/00* | (2019.01) |
| *G06T 19/20* | (2011.01) |
| *G06V 10/46* | (2022.01) |

(Continued)

(52) U.S. Cl.
CPC ............ *G06T 5/002* (2013.01); *G06K 9/6256* (2013.01); *G06K 9/6262* (2013.01); *G06N 20/00* (2019.01); *G06T 7/40* (2013.01); *G06T 7/60* (2013.01); *G06T 15/06* (2013.01); *G06T 19/20* (2013.01); *G06V 10/462* (2022.01);
*G06V 20/10* (2022.01); *G06V 20/64* (2022.01); *G06N 3/0454* (2013.01); *G06T 2207/20081* (2013.01); *G06T 2219/2024* (2013.01)

(58) Field of Classification Search
CPC ......... G06T 5/002; G06T 19/20; G06T 15/06; G06T 7/60; G06T 7/40; G06T 2219/2024; G06T 2207/20081; G06K 9/6262; G06K 9/00664; G06K 9/00201; G06K 9/6256; G06K 9/4671; G06N 20/00; G06N 3/0454

See application file for complete search history.

(56) References Cited

U.S. PATENT DOCUMENTS

| | | |
|---|---|---|
| 5,526,446 A | 6/1996 | Adelson |
| 6,353,816 B1 | 3/2002 | Tsukimoto |

(Continued)

OTHER PUBLICATIONS

Cheng et al., "ImageSpirit", ACM Transactions on Graphics, ACM, NY, US, vol. 34, No. 1, Dec. 29, 2014, pp. 1-11.

(Continued)

*Primary Examiner* — Christopher Wait
(74) *Attorney, Agent, or Firm* — Van Pelt, Yi & James LLP

(57) ABSTRACT

A machine learning based image processing architecture and associated applications are disclosed herein. In some embodiments, a machine learning framework is trained to learn low level image attributes such as object/scene types, geometries, placements, materials and textures, camera characteristics, lighting characteristics, contrast, noise statistics, etc. Thereafter, the machine learning framework may be employed to detect such attributes in other images and process the images at the attribute level.

54 Claims, 9 Drawing Sheets

Related U.S. Application Data

(60) Provisional application No. 62/541,603, filed on Aug. 4, 2017.

(51) Int. Cl.
  *G06V 20/10* (2022.01)
  *G06V 20/64* (2022.01)
  *G06T 15/06* (2011.01)
  *G06N 3/04* (2006.01)

(56) References Cited

U.S. PATENT DOCUMENTS

| | | |
|---|---|---|
| 6,816,621 B1 | 11/2004 | Handley |
| 7,573,508 B1 | 8/2009 | Kondo |
| 9,940,753 B1 | 4/2018 | Anselm |
| 10,388,059 B2 | 8/2019 | Luebke |
| 10,451,900 B2 | 10/2019 | Fonte |
| 10,453,165 B1 | 10/2019 | Kostov |
| 10,567,641 B1 | 2/2020 | Rueckner |
| 10,783,549 B2 | 9/2020 | Sinha |
| 2002/0146179 A1 | 10/2002 | Handley |
| 2003/0039401 A1 | 2/2003 | Gallagher |
| 2003/0187354 A1 | 10/2003 | Rust |
| 2005/0060142 A1 | 3/2005 | Erik |
| 2005/0083556 A1 | 4/2005 | Carlson |
| 2005/0147291 A1 | 7/2005 | Huang |
| 2005/0147292 A1 | 7/2005 | Huang |
| 2008/0158400 A1 | 7/2008 | Reyneri |
| 2010/0066868 A1 | 3/2010 | Shohara |
| 2010/0111436 A1 | 5/2010 | Jung |
| 2010/0189358 A1 | 7/2010 | Kaneda |
| 2011/0137837 A1 | 6/2011 | Kobayashi |
| 2012/0195378 A1 | 8/2012 | Zheng |
| 2013/0051519 A1 | 2/2013 | Yang |
| 2013/0128056 A1 | 5/2013 | Chuang |
| 2013/0182779 A1 | 7/2013 | Lim |
| 2013/0235067 A1 | 9/2013 | Cherna |
| 2014/0043436 A1 | 2/2014 | Bell |
| 2015/0055085 A1 | 2/2015 | Fonte |
| 2015/0172677 A1 | 6/2015 | Norkin |
| 2015/0189186 A1 | 7/2015 | Fahn |
| 2015/0228110 A1 | 8/2015 | Hecht |
| 2015/0294193 A1 | 10/2015 | Tate |
| 2015/0296152 A1 | 10/2015 | Fanello |
| 2015/0378325 A1 | 12/2015 | El Zur |
| 2016/0321523 A1 | 11/2016 | Sen |
| 2016/0373743 A1 | 12/2016 | Zhao |
| 2017/0097948 A1* | 4/2017 | Kerr ............... G06F 16/532 |
| 2017/0098152 A1 | 4/2017 | Kerr |
| 2017/0103512 A1 | 4/2017 | Mailhe |
| 2017/0108569 A1 | 4/2017 | Harvey |
| 2017/0148158 A1 | 5/2017 | Najarian |
| 2017/0150180 A1 | 5/2017 | Lin |
| 2017/0193332 A1 | 7/2017 | Kim |
| 2017/0294010 A1 | 10/2017 | Shen |
| 2017/0300785 A1 | 10/2017 | Merhav |
| 2017/0337657 A1 | 11/2017 | Cornell |
| 2017/0344807 A1 | 11/2017 | Jillela |
| 2018/0018970 A1 | 1/2018 | Heyl |
| 2018/0089583 A1 | 3/2018 | Iyer |
| 2018/0114096 A1 | 4/2018 | Sen |
| 2018/0121762 A1 | 5/2018 | Han |
| 2018/0147015 A1 | 5/2018 | She |
| 2018/0286037 A1 | 10/2018 | Zaharchuk |
| 2018/0293496 A1 | 10/2018 | Vogels |
| 2018/0293710 A1 | 10/2018 | Meyer |
| 2018/0300865 A1 | 10/2018 | Weiss |
| 2018/0316918 A1 | 11/2018 | Drugeon |
| 2018/0365856 A1 | 12/2018 | Parasnis |
| 2019/0026884 A1 | 1/2019 | Huang |
| 2019/0026956 A1 | 1/2019 | Gausebeck |
| 2019/0244011 A1 | 8/2019 | Liu |
| 2019/0261945 A1 | 8/2019 | Funka-Lea |
| 2019/0311199 A1 | 10/2019 | Mukherjee |

OTHER PUBLICATIONS

Sarkar et al., "Trained 3D Models for CNN based Object Recognition", Proceedings of the 12th International Joint Conference on Computer Vision, Imaging and Computer Graphics Theory and Applications, Mar. 1, 2017, pp. 130-137.

Yu et al., "Semantic Jitter: Dense Supervision for Visual Comparisons via Synthetic Images", arxiv.org, Cornell University Library, Ithaca, NY, Dec. 19, 2016.

Baharul et al., A Survey of Aesthetics-Driven Image Recomposition, Multimedia Tools and Applications, vol. 76, No. 7, pp. 9517-9542, May 13, 2016.

Laffont et al., Transient Attributes for High-Level Understanding and Editing of Outdoor Scenes, ACM Transactions an Graphics, vol. 33, No. 4, Article 149, Jul. 27, 2014.

Zhou et al., GeneGAN: Learning Object Transfiguration and Attribute Subspace from Unpaired Data, Student, Prof, Collaborator BMVC Author Guidelines, pp. 1-13, May 14, 2017.

* cited by examiner

MACHINE LEARNING BASED IMAGE PROCESSING TECHNIQUES

CROSS REFERENCE TO OTHER APPLICATIONS

This application is a continuation of U.S. patent application Ser. No. 16/056,110, now U.S. Pat. No. 10,902,559, entitled MACHINE LEARNING BASED IMAGE PROCESSING TECHNIQUES filed Aug. 6, 2018, which claims priority to U.S. Provisional Patent Application No. 62/541,603 entitled DIRECT AND DERIVED 3D DATA FOR MACHINE LEARNING IN IMAGE BASED APPLICATIONS filed Aug. 4, 2017, both of which are incorporated herein by reference for all purposes.

BACKGROUND OF THE INVENTION

Image processing techniques have classically operated at a pixel level, i.e., on pixel values or intensities. However, operating on low-level pixel data is not practical for applications such as altering the high-level visual appearance of an image. For such tasks, feature-based approaches are more effective. Feature-based techniques include first defining a set of specific features (e.g., edges, patches, SURF, SIFT, etc.) and then defining mathematical models on those features that can be used to analyze and manipulate image content.

Machine learning techniques may be employed to learn either or both features and mathematical model parameters based on pertinent application dependent cost functions. However, such artificial intelligence techniques require an exhaustive training data set that spans the space of all features for a particular application and that is labeled with relevant ground truth data. It has typically been prohibitive to gather exhaustive training data sets for most useful applications. Furthermore, it has been difficult to label images with more complex or sophisticated ground truth data. Thus, the use of machine learning techniques until lately has been limited to basic object recognition or classification applications.

An image processing architecture that overcomes such limitations and effectively leverages machine learning techniques is thus needed and disclosed herein as well as novel image-based applications resulting therefrom.

BRIEF DESCRIPTION OF THE DRAWINGS

Various embodiments of the invention are disclosed in the following detailed description and the accompanying drawings.

DETAILED DESCRIPTION

Figure 1:
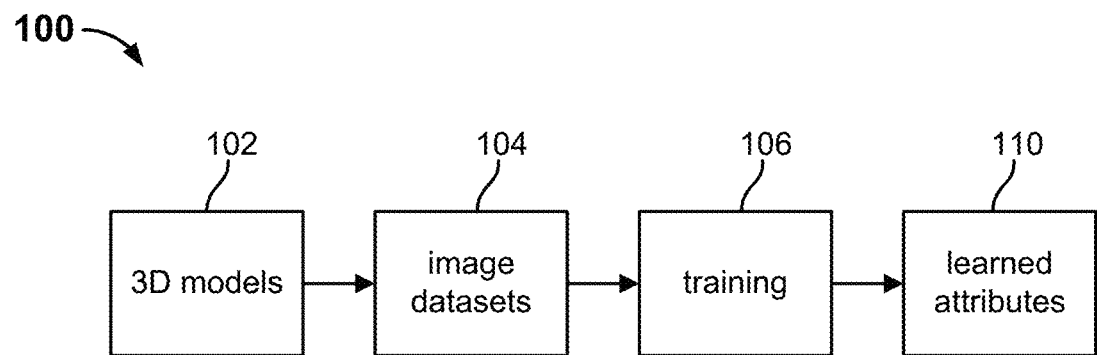
FIG. 1 is a high level block diagram of an embodiment of a machine learning based image processing framework for learning attributes associated with datasets.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

An image processing architecture and image-based applications resulting therefrom are disclosed herein. Generally, images may comprise scenes including a single object, a plurality of objects, or rich (virtual) environments and furthermore may comprise stills or frames of animation or video sequences. Moreover, images may comprise (high quality) photographs or (photorealistic) renderings.

Artificial intelligence techniques including machine learning techniques are data driven and therefore require exhaustive training data sets to be effective for most practical applications. Thus, the basis for using machine learning techniques for image-based applications relies on access to comprehensive training data sets that have been labeled or tagged with appropriate metadata that is relevant for desired applications.

In this description, machine learning techniques are generally described and in various embodiments may comprise the use of any combination of one or more machine learning architectures appropriate for a given application, such as deep neural networks and convolutional neural networks. Moreover, the terms "labels", "tags", and "metadata" are interchangeably used in this description to refer to properties or attributes associated and persisted with a unit of data or content, such as an image.

A fundamental aspect of the disclosed image processing architecture comprises a content generation platform for generating comprehensive image data sets labeled with relevant ground truth data. Such data sets may be populated, for example, with images rendered from three-dimensional (polygon mesh) models and/or captured from imaging devices such as cameras or scanning devices such as 3D scanners. Image data sets encompassing exhaustive permutations of individual and/or combinations of objects and arrangements, camera perspectives or poses, lighting types and locations, materials and textures, etc., may be generated, for example, during offline processes. Image assets may moreover be obtained from external sources. Metadata may be generated and associated with (e.g., used to label or tag) images when the images are generated at the time of generation and/or may be added or modified afterwards and furthermore may be automatically generated and/or may at least in part be determined or defined manually.

FIG. 1 is a high level block diagram of an embodiment of a machine learning based image processing framework 100 for learning attributes associated with datasets. Image datasets 104 are collected or generated. In many cases, an image dataset 104 comprises high quality (i.e., high definition or resolution) photographs or photorealistic renderings. An image dataset 104 may at least in part be populated by images rendered from three-dimensional models 102 as depicted in the example of FIG. 1, images captured from imaging or scanning devices, images sourced from external entities, or images generated from other existing images using various processing techniques. Generally, datasets 104 includes any arbitrary number of permutations of different perspectives or viewpoints, materials and textures, lighting sources and locations, camera configurations, object combinations and placements, etc.

Images comprising datasets 104 are tagged with comprehensive sets of labels or metadata. A set of labels defined and/or selected for images of a prescribed dataset may at least in part be application dependent. The set of labels may include one or more hierarchical high level labels that provide classification of the object(s) and/or scene comprising an image. The set of labels may furthermore include lower level labels comprising ground truth data associated with rendering an image or parts thereof from underlying three-dimensional model(s) or capturing the image using a physical device such as a camera or a scanner. Examples of such labels include labels associated with the (three-dimensional) geometry of the scene comprising the image such as object types and locations, material properties of objects comprising the scene, surface normal vectors, lighting types and positions (e.g., direct sources as well as indirect sources such as reflective surfaces that contribute to substantial higher order bounces), camera characteristics (e.g., perspective or pose, orientation, rotation, depth information, focal length, aperture, zoom level), etc. The labels may include absolute and/or relative location or position, orientation, and depth information amongst various scene objects, light sources, and the (virtual) camera that captures the scene. Other labels that are not scene-based but instead image-based such as noise statistics (e.g., the number of samples of rays used in ray tracing when rendering) may be associated with an image. Furthermore, more complex or sophisticated labels may be defined for various applications by combining a plurality of other labels. Examples include defining labels for specific object poses relative to light sources, presence of special materials (e.g., leather) with specific light sources, etc.

As described, knowledge of ground truth data associated with generating images comprising a dataset 104 facilitates detailed as well as custom (e.g., application specific) labels to be associated with the images comprising the dataset 104, including many types and classes of labels that otherwise could not be manually identified and associated with images such as lighting type and location. Extensive, labeled datasets 104 are perfectly qualified for artificial intelligence based learning. Training 106 on a dataset 104, for example, using any combination of one or more appropriate machine learning techniques such as deep neural networks and convolutional neural networks, results in a set of one or more low level properties or attributes 110 associated with the dataset 104 to be learned. Such attributes may be derived or inferred from labels of the dataset 104. Examples of attributes that may be learned include attributes associated with object/scene types and geometries, materials and textures, camera characteristics, lighting characteristics, noise statistics, contrast (e.g., global and/or local image contrast defined by prescribed metrics, which may be based on, for instance, maximum and minimum pixel intensity values), etc. Other more intangible attributes that are (e.g., some unknown nonlinear) combinations or functions of a plurality of low level attributes may also be learned. Examples of such intangible attributes include attributes associated with style, aesthetic, noise signatures, etc. In various embodiments, different training models may be used to learn different attributes. Furthermore, image processing framework 100 may be trained with respect to a plurality of different training datasets. After training on large sets of data to learn various attributes, image processing framework 100 may subsequently be employed to detect similar attributes or combinations thereof in other images for which such attributes are unknown as further described below.

Many applications include the creation of collections or portfolios of curated images that share one or more attributes or properties that are difficult to quantify or define but that collectively contribute to a distinct signature style or visual appearance. For example, images comprising product catalogs published by high end merchants or retailers typically have a specific branded style or aesthetic, and similarly frames of scenes of animation or video sequences are all often constrained to prescribed visual characteristics. In such applications, captured photographs or generated renderings are often subjected to manual post-processing (e.g., retouching and remastering) by artists to create publishable imagery having visual characteristics that conform to a desired or sanctioned style or aesthetic or theme. Many of the properties that contribute to style or aesthetic or theme are the result of artist manipulation beyond anything that can be achieved from photography/rendering or global post-processing. Thus, an artist imparted aesthetic on an image is an intangible quality that has conventionally been difficult to isolate, model, and replicate. As a result, many existing applications still require artists to manually post-process each image or frame to obtain a desired curated look.

Figure 2:
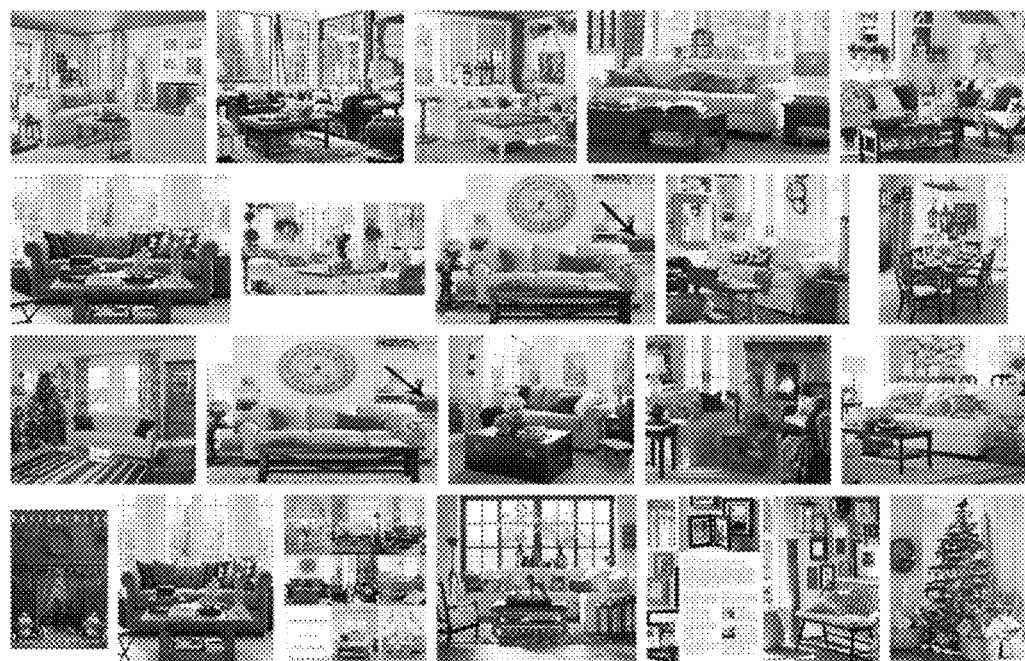
FIG. 2 illustrates examples of curated images from a catalog.

FIG. 2 illustrates examples of curated images from a catalog of a home furnishings retailer. As depicted, each image comprises different products as well as product placements, but the entire set of images shares the same high level style or aesthetic defining an inspired, branded look. The curated images of FIG. 2 result from post-processing by an artist and are not specifically labeled with low level attributes or ground truth data. However, as can be seen, all images belong to a set having common characteristics other than just having similar types of content (i.e., home furnishings). In the given example, all images share the same aesthetic particular to a prescribed brand and thus visually appear similar and are recognizable as belonging to the same set. In some embodiments, the high level attribute of the set of images that results in the shared similar look may be modeled by a nonlinear function of one or more lower level attributes that collectively define an aesthetic as further described next.

Figure 3:
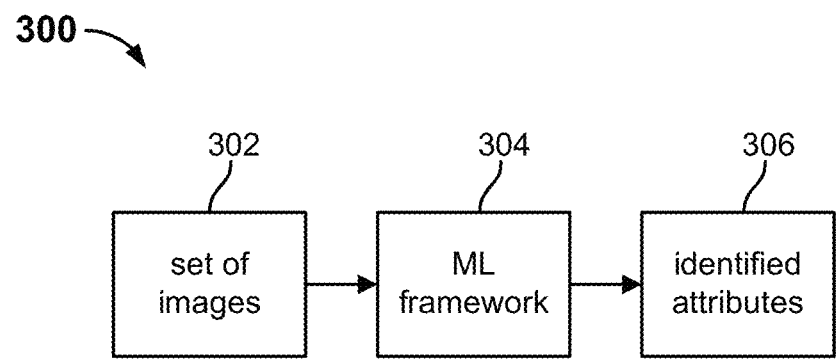
FIG. 3 is a high level block diagram of an embodiment of an image processing framework for reducing or decomposing images belonging to a set into key attributes.

FIG. 3 is a high level block diagram of an embodiment of an image processing framework 300 for reducing or decomposing images belonging to a set into key attributes, one or more of which may collectively define a high level aesthetic attribute of the set. Framework 300 operates on images 302 belonging to a set. Images 302 may comprise photographs or renderings. In some embodiments, the set of images 302 comprises a curated set or catalog of images (e.g., such as the images of FIG. 2) that results from artist post-processing or manipulation to achieve a prescribed style or aesthetic or theme. In some cases, the images 302 are not labeled or tagged, e.g., with ground truth data. However, images 302 belong to the same set and, thus, share one or more common properties or attributes such as content type as well as visual characteristics and appearance. The set of images 302 are processed by a machine learning based framework 304 (e.g., which may comprise framework 100 of FIG. 1) to detect or identify a set of one or more high and low level attributes 306 associated with the set of images 302.

In some cases, machine learning based framework 304 is trained on large labeled image datasets comprising a substantial subset of, if not all, possible permutations of objects of a constrained set of possible objects that may appear in a prescribed scene type in order to learn associated attributes and combinations thereof and which may subsequently be employed to detect or identify such attributes in other images such as a corresponding set of curated or artist processed images 302 that include objects from the same constrained set of possible objects. Examples of attributes 306 that may be detected for the set of images 302 include object/scene types and geometries, materials and textures, camera characteristics, lighting characteristics, noise statistics, contrast, etc. In some embodiments, a high level aesthetic attribute that results in images 302 having a shared look is defined by a (e.g., unknown nonlinear) function or combination of a plurality of identified low level attributes 306. The described machine learning based framework 304 facilitates identifying shared properties of images belonging to a set 302 and identifying and isolating a high level shared style or aesthetic attribute that includes artist imparted characteristics. Attributes 306 identified for the set of images 302 may be employed to automatically label or tag images 302 that do not already have such labels or tags.

Figure 4:
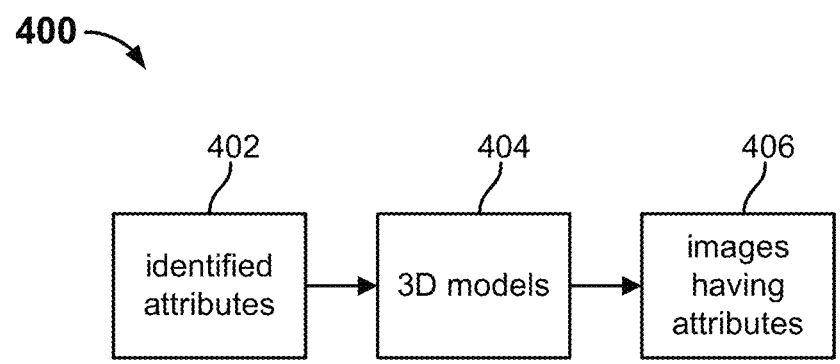
FIG. 4 is a high level block diagram of an embodiment of an image processing framework for automatically generating curated images.

As previously described, many applications require artists to post-process images to impart prescribed styles or aesthetics. Thus, in such applications, curated imagery suitable for publication is often limited to a small number of viable shots that conform to a desired style or aesthetic. It would be useful to automatically generate more extensive sets of curated images, for example, that have prescribed styles or aesthetics but without requiring artists to impart the styles or aesthetics via post-processing. FIG. 4 is a high level block diagram of an embodiment of an image processing framework 400 for automatically generating curated images without artist input. As depicted, a set of attributes 402, e.g., identified from a small set of artist created curated images such as using framework 300 of FIG. 3, is applied to available three-dimensional object models 404 with configurable properties (geometries, lightings, materials, camera poses, etc.) to render any number of images 406 having attributes 402. Rendered images 406 automatically have the curated visual appearance that is defined by attributes 402 but without requiring artist input or post-processing.

In some embodiments, three-dimensional (polygon mesh) models for most, if not all, individual objects comprising a constrained set of possible objects that may be included in a prescribed scene type exist and may be employed to automatically render any number of additional curated shots of the scene type without artist input but having the same aesthetic or style as a relatively small set of artist created base imagery from which aesthetic or style attributes are identified, for example, using framework 300 of FIG. 3. In some cases, a super catalog of curated images for a prescribed scene type may be generated of which only a small subset of shots are artist created and the rest are rendered automatically using framework 400. In some cases, a super catalog includes images comprising many, if not all, possible permutations and combinations of objects, materials, lightings, camera poses, placements, etc., associated with a particular scene space that all exhibit a prescribed style or aesthetic defined by attributes 402 but without requiring artist post-processing to impart the style or aesthetic. That is, aesthetic attributes isolated using framework 300 of FIG. 3 may be used to render additional new images having that same aesthetic (i.e., the same low level attributes 306/402 that define the aesthetic) using the three-dimensional object models of framework 400. Images 406 generated using framework 400 may automatically be labeled or tagged with appropriate metadata or ground truth data since such images are rendered from well-defined three-dimensional models and known attributes. Moreover, large sets of labeled images 406 that are generated may be employed to further train and build an associated machine learning based framework (e.g., framework 100 of FIG. 1).

Figure 5:
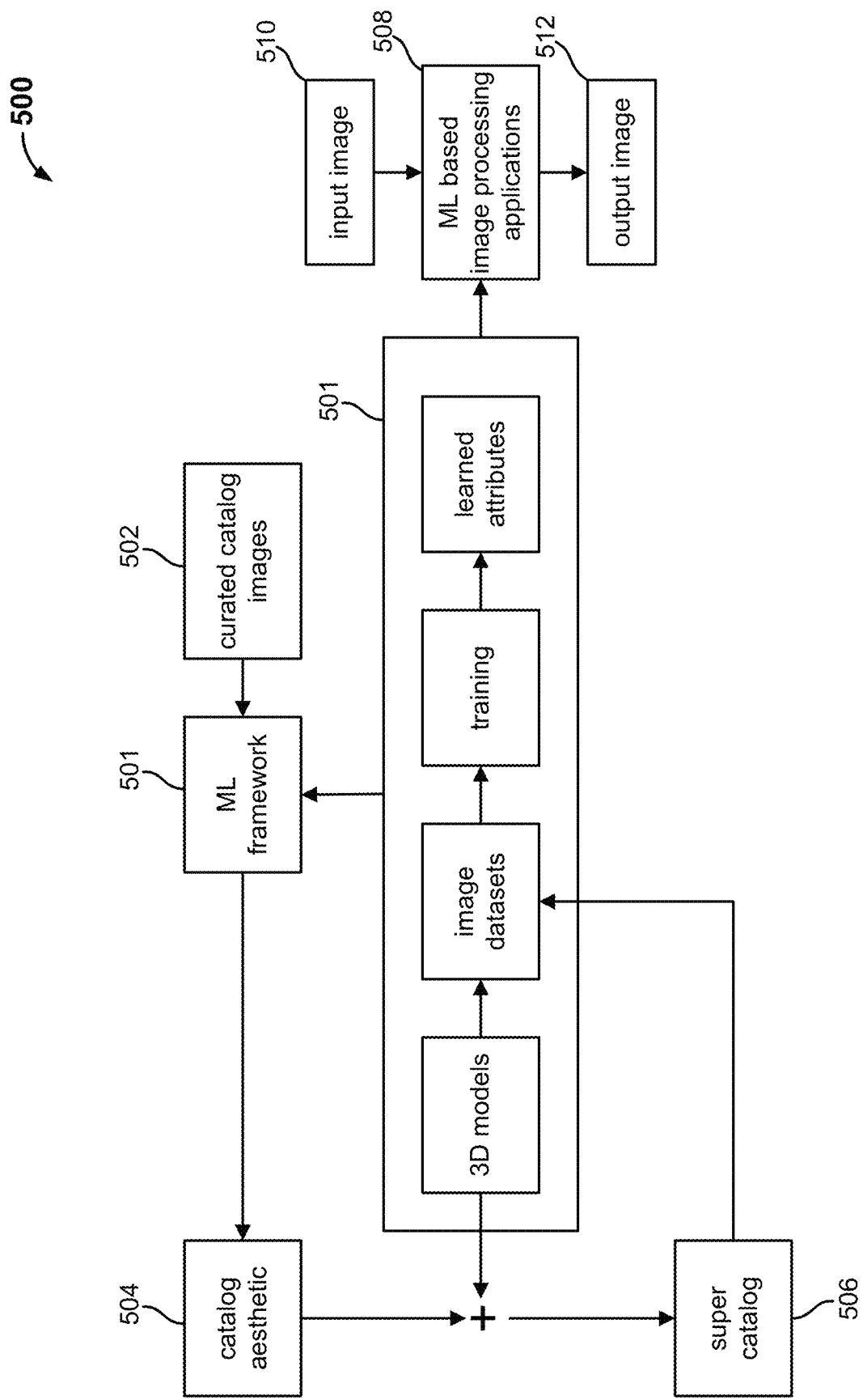
FIG. 5 is a high level block diagram of an embodiment of a machine learning based image processing architecture.

FIG. 5 is a high level block diagram of an embodiment of a machine learning based image processing architecture 500. As depicted, image processing architecture 500 includes many components that have separately been described in detail with respect to FIGS. 1-4. Machine learning framework 501 (which may comprise framework 100 of FIG. 1) is the foundation of image processing architecture 500 and trains on large datasets, e.g., which may at least in part be generated from available three-dimensional models, to learn attributes associated with the datasets. Machine learning framework 501 may then be used, for example, with other images to detect or identify such attributes or combinations thereof, which may not be known for the images prior to detection by machine learning framework 501.

In one example, machine learning framework 501 identifies attributes that collectively define an aesthetic 504 of a small set of curated catalog images 502 that have been post-processed by artists to have the aesthetic. In some cases, the isolated aesthetic (i.e., corresponding attributes) 504 may be applied to available three-dimensional models to generate a super catalog 506 of additional curated catalog images that all have that aesthetic but without requiring artist post-processing like the original set 502. Super catalog 506 may be used to further train and build machine learning framework 501. Thus, aesthetics or styles or themes may be identified using machine learning framework 501 and then applied to available three-dimensional models to generate additional datasets on which machine learning framework 501 may be further trained.

Machine learning framework 501 generally facilitates a variety of image processing applications 508 for modifying input images 510 or parts thereof to generate corresponding output images 512 having the desired modifications. Both high and low level attributes associated with images are detectable, and high level attributes are separable into constituent lower level attributes. Thus, independent decisions can be made on different attributes or combinations of attributes in various applications. Some example image processing applications 508 include restyling (e.g., changing aesthetic), object replacement, relighting (e.g., changing light source types and/or locations), etc., a few of which are further described next.

Figure 6A:
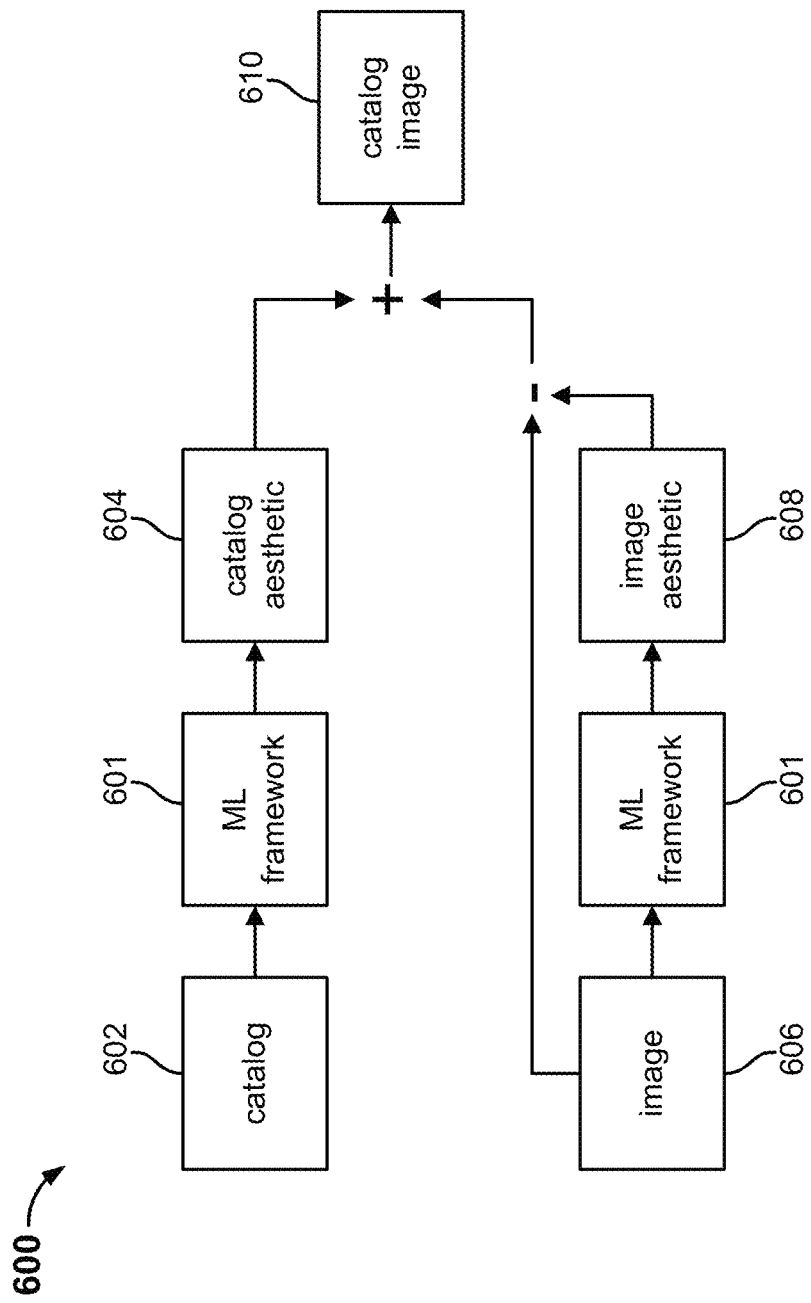
FIG. 6A is a high level block diagram of an embodiment of an image processing application for restyling.
Figure 6B:
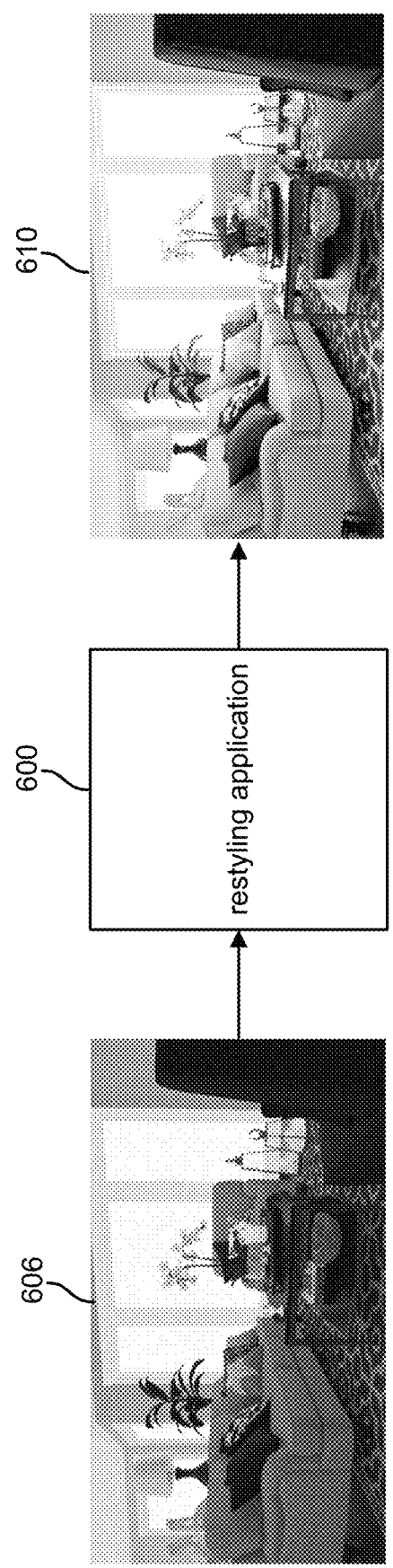
FIG. 6B illustrates an example of using a restyling application.

FIG. 6A is a high level block diagram of an embodiment of an image processing application 600 for restyling, and FIG. 6B illustrates an example of using restyling application 600. As depicted, machine learning framework 601 (e.g., framework 100 of FIG. 1 or framework 501 of FIG. 5) is employed to identify and isolate a catalog aesthetic 604 of an image catalog 602 and an image aesthetic 608 of an input image 606 so that the image aesthetic 608 can be removed or subtracted from image 606 and the catalog aesthetic 604 applied or added to image 606 to generate an output catalog version 610 of input image 606 that has the same aesthetic 604 as catalog 602. In this example, the types of attributes that comprise the catalog aesthetic 604 may be detected and isolated in input image 606 to determine image aesthetic 608. Restyling is illustrated in FIG. 6B in which an input image 606 is restyled by restyling application 600 to generate a catalog image 610 that conforms to a prescribed catalog aesthetic 604. In this example, changing the aesthetic comprises modifying the lighting or brightness at different parts of the image in different manners.

Figure 7A:
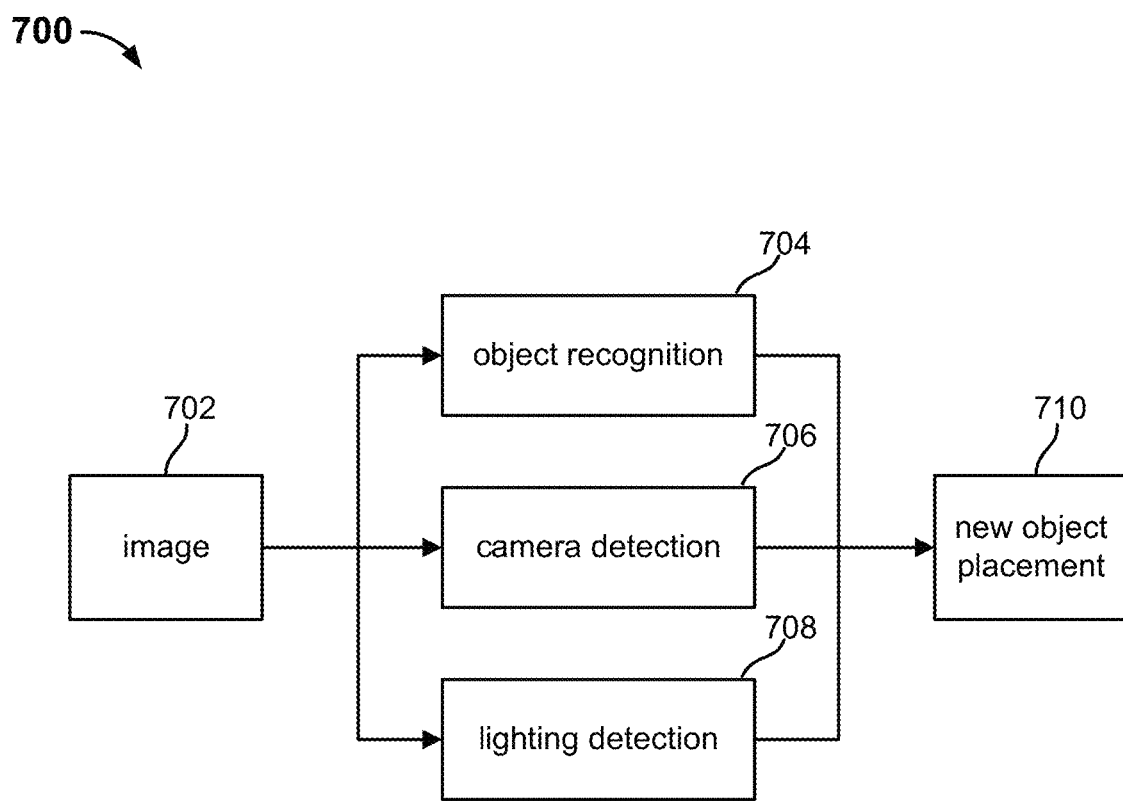
FIG. 7A is a high level block diagram of an embodiment of an image processing application for replacing an object in an image with a different object.
Figure 7B:
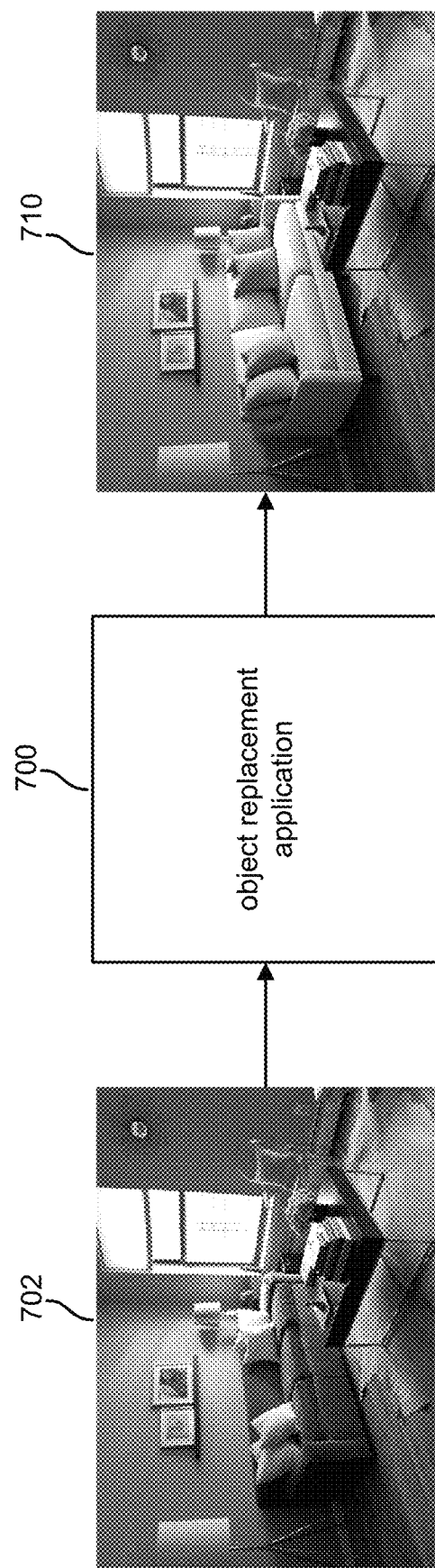
FIG. 7B illustrates an example of using an object replacement application.

FIG. 7A is a high level block diagram of an embodiment of an image processing application 700 for replacing an object in an image with a different object, and FIG. 7B illustrates an example of using object replacement application 700. In FIG. 7A, a machine learning framework (e.g., framework 100 of FIG. 1 or framework 501 of FIG. 5) is employed to identify attributes 704-708 of an input image 702 that are associated with a prescribed object so that the object can be replaced with another object 710. New object 710 may be configured to have some of the same identified attributes 704-708 so that it can be consistently included in image 710 in place of the replaced object. Object replacement is illustrated in FIG. 7B in which a sofa object in input image 702 is replaced with a different sofa object in output image 710.

Image processing applications 508 may furthermore comprise more complex enterprise applications such as aggregating objects from datasets having different aesthetic attributes into the same scene and styling to have a prescribed aesthetic. For example, home furnishings objects from one or more brands may be included in an image of a room but may be all styled to have the aesthetic of a prescribed brand. In such cases, the resulting image would have the curated look or aesthetic of a catalog image of the prescribed brand.

Generally, image processing applications 508 rely on attribute detection using machine learning framework 501. That is, actual attributes used to generate images 510 are detected using machine learning framework 501 and modified to generate output images 512 having modified attributes. Thus, image modification based on attribute detection, manipulation, and/or modification as described herein is notably different from conventional image editing applications that operate at pixel levels on pixel values and do not have information on actual image content (e.g., objects) and underlying attributes associated with the physics of capturing or rendering the content such as geometry, camera, lighting, materials, textures, placements, etc., on which the disclosed techniques are based. The disclosed attribute detection and manipulation techniques are especially useful for photorealistic applications because conventional pixel manipulations are not sufficiently constrained to generate images that look real and consistent.

Another useful application 508 based on machine learning framework 501 comprises image denoising. One or more learned spatial filters may be applied to various parts of a noisy input image 510 (e.g., that is generated using a low number of samples of rays during ray tracing) to remove noise so that output image 512 has a noise profile or quality that is comparable to that achievable using a large number of samples of rays. That is, various parts of a sparsely sampled image are filtered using a set of filters identified by machine learning framework 501 to generate an output image equivalent to ray tracing with a much larger number of samples (e.g., a number of samples needed for complete convergence). As one example, a ten sample ray traced image can quickly be transformed into the equivalent of a corresponding thousand sample ray traced image by filtering the ten sample ray traced image with appropriate filters identified by machine learning framework 501. Thus, image render time can substantially be reduced by only ray tracing with a small number of samples and then using filters that predict pixel values that would result from larger numbers of samples. This technique effectively eliminates the need to ray trace with large numbers of samples while still producing images having qualities or noise profiles that ray tracing with large numbers of samples provides.

In some embodiments, training datasets for such a denoising application comprise ray traced snapshots of images at different sampling intervals, with each snapshot labeled with an attribute specifying the number of samples for that snapshot in addition to being labeled with other image attributes. Machine learning framework 501 trains on such datasets to learn spatial filters or parameters thereof for different numbers of samples. For example, filters may be learned for transforming from a low number (x) of samples to a high number (y) of samples for many different values and combinations of x and y, where x<<y. Noise signatures, however, are not only based on numbers of samples but also on one or more other image attributes that affect noise (e.g., during ray tracing) such as materials and lighting. Thus, different filter parameters may be learned for attribute combinations that result in different noise signatures, and a machine learning framework 501 that identifies filters for an input image may identify different filters or parameters for different portions of the image. For example, a different set of filter parameters may be identified for a portion of an image that has attribute combination "ten samples on leather with bright light" than a portion of the image that has attribute combination "ten samples on fabric in dim light".

Figure 8A:
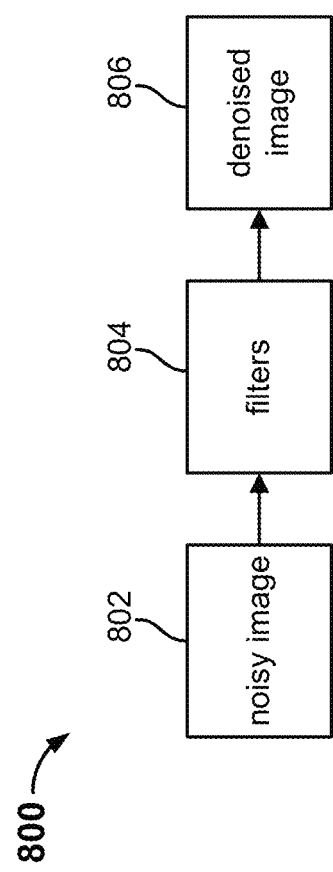
FIG. 8A is a high level block diagram of an embodiment of an image processing application for denoising an image.
Figure 8B:
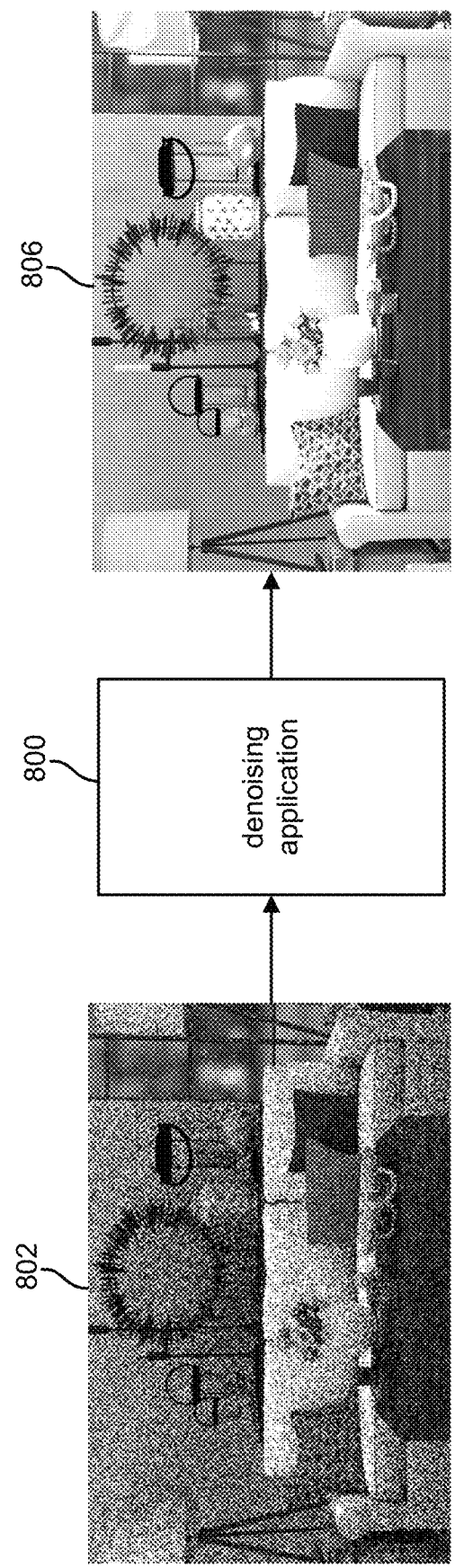
FIG. 8B illustrates an example of using a denoising application.

FIG. 8A is a high level block diagram of an embodiment of an image processing application 800 for denoising an image, and FIG. 8B illustrates an example of using denoising application 800. In FIG. 8A, a noisy (e.g., low sample count) input image 802 that violates a prescribed noise threshold is processed using one or more filters 804 that are identified by a machine learning based framework (e.g., framework 100 of FIG. 1 or framework 501 of FIG. 5) to generate a denoised output image 806 that satisfies the prescribed noise threshold. Thus, a noisy image 802 rendered using a low number of samples of rays is cleaned up or denoised 806 using learned filters 804, eliminating the need to actually ray trace with a large number of samples. Denoising is illustrated in FIG. 8B in which a sparsely sampled input image 802 is processed by application 800 to generate a high quality output image 806.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   detecting a set of one or more attributes of an input image using a machine learning framework trained on image datasets associated with a prescribed scene type to which the input image belongs; and
   generating an output image comprising a modified version of the input image by modifying at least a subset of the detected set of attributes;
   wherein the output image is generated by editing the input image based on attribute detection and modification instead of pixel level editing operations.

2. The method of claim 1, wherein the prescribed scene type comprises permutations or combinations of a constrained set of objects.

3. The method of claim 1, wherein the image datasets comprise labeled images rendered from three-dimensional object models.

4. The method of claim 1, wherein the detected set of attributes is not known for the input image prior to detection by the machine learning framework.

5. The method of claim 1, wherein the detected set of attributes is associated with an aesthetic.

6. The method of claim 5, wherein the output image has a different aesthetic than the input image.

7. The method of claim 1, wherein the detected set of attributes is associated with a style.

8. The method of claim 7, wherein the output image comprises a restyled version of the input image.

9. The method of claim 1, wherein the detected set of attributes is associated with an object in the input image.

10. The method of claim 9, wherein the object in the input image is replaced by a different object in the output image.

11. The method of claim 1, wherein the detected set of attributes is associated with lighting.

12. The method of claim 11, wherein the output image comprises a relit version of the input image.

13. The method of claim 1, wherein the detected set of attributes is associated with noise.

14. The method of claim 13, wherein the output image comprises a denoised version of the input image.

15. The method of claim 1, further comprising labeling or tagging the output image with a modified set of attributes.

16. The method of claim 1, wherein the detected set of attributes comprises one or more attributes associated with object/scene types, geometries, placements, materials, textures, camera characteristics, lighting characteristics, noise statistics, and contrast.

17. The method of claim 1, wherein the input image and the output image each comprises a photograph or a photorealistic rendering.

18. The method of claim 1, wherein the input image and the output image each comprises a frame of an animation or a video sequence.

19. A system, comprising:
   a processor configured to:
      detect a set of one or more attributes of an input image using a machine learning framework trained on image datasets associated with a prescribed scene type to which the input image belongs; and
      generate an output image comprising a modified version of the input image by modifying at least a subset of the detected set of attributes, wherein the output image is generated by editing the input image based on attribute detection and modification instead of pixel level editing operations; and
   a memory coupled to the processor and configured to provide the processor with instructions.

20. A computer program product embodied in a non-transitory computer readable storage medium and comprising computer instructions for:
   detecting a set of one or more attributes of an input image using a machine learning framework trained on image datasets associated with a prescribed scene type to which the input image belongs; and
   generating an output image comprising a modified version of the input image by modifying at least a subset of the detected set of attributes;
   wherein the output image is generated by editing the input image based on attribute detection and modification instead of pixel level editing operations.

21. The system of claim 19, wherein the prescribed scene type comprises permutations or combinations of a constrained set of objects.

22. The system of claim 19, wherein the image datasets comprise labeled images rendered from three-dimensional object models.

23. The system of claim 19, wherein the detected set of attributes is not known for the input image prior to detection by the machine learning framework.

24. The system of claim 19, wherein the detected set of attributes is associated with an aesthetic.

25. The system of claim 24, wherein the output image has a different aesthetic than the input image.

26. The system of claim 19, wherein the detected set of attributes is associated with a style.

27. The system of claim 26, wherein the output image comprises a restyled version of the input image.

28. The system of claim 19, wherein the detected set of attributes is associated with an object in the input image.

29. The system of claim 28, wherein the object in the input image is replaced by a different object in the output image.

30. The system of claim 19, wherein the detected set of attributes is associated with lighting.

31. The system of claim 30, wherein the output image comprises a relit version of the input image.

32. The system of claim 19, wherein the detected set of attributes is associated with noise.

33. The system of claim 32, wherein the output image comprises a denoised version of the input image.

34. The system of claim 19, wherein the processor is further configured to label or tag the output image with a modified set of attributes.

35. The system of claim 19, wherein the detected set of attributes comprises one or more attributes associated with object/scene types, geometries, placements, materials, textures, camera characteristics, lighting characteristics, noise statistics, and contrast.

36. The system of claim 19, wherein the input image and the output image each comprises a photograph or a photorealistic rendering.

37. The system of claim 19, wherein the input image and the output image each comprises a frame of an animation or a video sequence.

38. The computer program product of claim 20, wherein the prescribed scene type comprises permutations or combinations of a constrained set of objects.

39. The computer program product of claim 20, wherein the image datasets comprise labeled images rendered from three-dimensional object models.

40. The computer program product of claim 20, wherein the detected set of attributes is not known for the input image prior to detection by the machine learning framework.

41. The computer program product of claim 20, wherein the detected set of attributes is associated with an aesthetic.

42. The computer program product of claim 41, wherein the output image has a different aesthetic than the input image.

43. The computer program product of claim 20, wherein the detected set of attributes is associated with a style.

44. The computer program product of claim 43, wherein the output image comprises a restyled version of the input image.

45. The computer program product of claim 20, wherein the detected set of attributes is associated with an object in the input image.

46. The computer program product of claim 45, wherein the object in the input image is replaced by a different object in the output image.

47. The computer program product of claim 20, wherein the detected set of attributes is associated with lighting.

48. The computer program product of claim 47, wherein the output image comprises a relit version of the input image.

49. The computer program product of claim 20, wherein the detected set of attributes is associated with noise.

50. The computer program product of claim 49, wherein the output image comprises a denoised version of the input image.

51. The computer program product of claim 20, further comprising computer instructions for labeling or tagging the output image with a modified set of attributes.

52. The computer program product of claim 20, wherein the detected set of attributes comprises one or more attributes associated with object/scene types, geometries, placements, materials, textures, camera characteristics, lighting characteristics, noise statistics, and contrast.

53. The computer program product of claim 20, wherein the input image and the output image each comprises a photograph or a photorealistic rendering.

54. The computer program product of claim 20, wherein the input image and the output image each comprises a frame of an animation or a video sequence.

* * * * *